United States Patent [19]

MacMillan et al.

[11] Patent Number: 5,007,080
[45] Date of Patent: Apr. 9, 1991

[54] COMMUNICATION SYSTEM SUPPORTING REMOTE OPERATIONS

[75] Inventors: Ian MacMillan, Nepean; Vish Raju, Kanata, both of Canada

[73] Assignee: Mitel Corporation, Ontario, Canada

[21] Appl. No.: 304,472

[22] Filed: Feb. 1, 1989

[30] Foreign Application Priority Data

Feb. 4, 1988 [CA] Canada .................... 558123

[51] Int. Cl.$^5$ ............................. H04M 3/42
[52] U.S. Cl. ........................ 379/269; 379/32; 379/201
[58] Field of Search ............ 379/269, 201, 207, 34, 379/60, 32, 279

[56] References Cited

U.S. PATENT DOCUMENTS

| | | | |
|---|---|---|---|
| 4,771,448 | 9/1988 | Koohgoli et al. | 379/60 |
| 4,782,517 | 11/1988 | Bernardis et al. | 379/201 |
| 4,811,380 | 3/1989 | Spear | 379/60 |
| 4,833,701 | 5/1989 | Comroe et al. | 379/60 |

OTHER PUBLICATIONS

"A New Protocol for Call Handling Functions for the SPC Network", G. Gawdrys et al., IEEE Globecom '82 (Miami, Dec. 1982) Conf. Rec., pp. 735-738.

"Voice/Data Integration: An Applications Perspective", C. Strathmeyer, *IEEE Communications Magazine*, vol. 25, No. 12, Dec. 1987, pp. 30-35.

"Thinking About the Post-ONA Environment", R. Weindrich, *Telephony*, Feb. 8, 1988, pp. 32-35.

*Primary Examiner*—Thomas W. Brown
*Attorney, Agent, or Firm*—Antonelli, Terry, Stout & Kraus

[57] ABSTRACT

A communication system for implementing remote operations between a PABX and a host computer, conforming to Open Systems Interconnect (OSI) communication protocol. Circuitry is provided in each of the PABX and host computer for generating and encoding invoke, return result, error and reject operation protocol data unit signals, for transmission between application layer entities of the PABX and host computer. In order to support invoking of asynchronous telephony operations, invoke address and server address fields are incorporated within the argument sequence and the result sequence of the invoke and return result operation protocol data unit signals, respectively.

17 Claims, 1 Drawing Sheet

COMMUNICATION SYSTEM SUPPORTING REMOTE OPERATIONS

FIELD OF THE INVENTION

This invention relates in general communications systems, and more particularly to a method and apparatus for effecting remote operations between a PABX and host computer conforming to Open Systems Interconnect (OSI) communication protocol.

BACKGROUND OF THE INVENTION

A number of prior art communication protocols have been developed to allow an external controller to communicate with a PABX. According to such protocols, the external controller (i.e. host computer) can obtain information from the PABX (e.g. the status of predetermined lines and trunk circuits, etc.), to analyze the PABX data base (e.g. in order to determine what features have been programmed into the PABX), and to allow external control of the machine (e.g. in order to place a call, etc.).

DESCRIPTION OF THE PRIOR ART

One such prior art protocol has been developed for ACD Systems by Technotron Ihfoswitch Corporation and is comprised of a proprietary command language, which enables external control of a proprietary PABX from a remote host computer.

Another protocol has been developed by IBM Corp., entitled Netview TM PC, which serves as a maintenance program which can be used as a terminal interface to a PABX.

Both of the aforementioned prior art protocols suffer from the disadvantage that they do not conform to established standards for facilitating international message exchange as defined by the CCITT under the designation Open Systems Interconnect (OSI).

The OSI recommendations define standard data transfer protocols which are expected to be adopted by all major communication systems manufacturers on an international scale in order that systems manufactured in various countries by different manufacturers may communicate with each other according to the standardized protocols.

For example, CCITT recommendation X.410 defines Remote Operations Services (ROS) for establishing a remote procedure call facility used to structure interactive application layer protocols. The X.410 recommendation specifies Operation Protocol Data Units (OPDUs) that are exchanged between application layer entities in order to invoke an operation and report its outcome.

More particularly, the X.410 recommendation defines the aforementioned Remote Operations Service (ROS) as running on top of a Reliable Transfer Server (RTS) by which information is transferred in either monologue or 2-way alternate half-duplex. In the case of 2-way alternate, the transfer of data units is governed by a "turn" which can be transferred between Application Entities within the communication systems. RTS however does not conform well to implementation of remote operations in a telephony environment. Telephony events are asynchronous in nature and must be acted upon when they occur (i.e. time is important). The RTS session as defined by the standard X.410 ROS, is incapable of accepting an invocation or result at any time. Instead, an invocation or result can be accepted by the RTS only when the "turn" has been transferred thereto.

Furthermore, in a telephony environment several operations may cause a resource allocation in a target Application Entity. An example of resource allocation in a telephony environment would be invocation by the host computer of a MONITOR operation which causes the PABX to start reporting to the host computer any call information relating to a given device (e.g. a telephone set), and causes the PABX to remember that the monitor has been invoked. The fact that the PABX must remember that it is to continuously monitor the given device is an example of a situation where the action of an operation continues beyond simply executing the operation and returning a result. However, in order to implement a standardized application layer protocol for remote operations, it is necessary to associate subsequent actions of an invoked operation with the original operation invoked.

An Application Entity is a device, which may be a hardware device, implemented in software in a processor, or a combination of both, which causes a particular function (application) to occur in a designated apparatus in a system with which the Application Entity operates.

Remote operations as contemplated by the X.410 recommendation, consist of invoking the operation and returning a result. Hence, a transaction continues under X.410 until it is specifically ended by either the host computer or the PABX. The invoke ID defined by the X.410 recommendation is insufficient to provide a transaction identification code for remote operations requiring a resource allocation since the lifetime of the invoke OPDU is defined as being only that of the original operation.

SUMMARY OF THE INVENTION178

According to the present invention means are provided in the host computer and PABX for generating and encoding an invoke address field and a server address field in all invoke and result OPDUs generated by the Application Entities. For example, in the event the host computer wishes to invoke a remote operation causing a resource allocation (e.g. the aforementioned MONITOR operation), the Application Entity requesting the operation within the host computer generates and encodes an invoke OPDU with an invoking address field for identifying the invoking Application Entity, and a null (0 value) server address field since the host computer does not have the data as to which Application Entity of the PABX will perform the operation. Upon receipt of the invoke OPDU by the PABX, an Application Entity is assigned to service the operation, and a server address is assigned by the server Application Entity and returned to the original invoking address in the result OPDU. After this interaction, each Application Entity has the data as to the address of the other. Therefore, all subsequent call status invoke OPDUs from the PABX concerning the monitored device, will be directed toward the original host computer application address from the PABX Application Entity. This allows the host computer to associate the call status messages with the original remote operation request.

In general, according to the present invention there is provided a system and method for effecting resource allocation remote operations in a pair of communication systems utilizing Open Systems Interconnect communication protocol, comprised of circuitry within respective ones of the communication systems for generating predetermined operation data signals associated with an invoking Application Entity; circuitry for transmitting the data signals between the communication systems in accordance with the protocol; and circuitry within the communication systems for receiving the data signals and in response allocating a server Application Entity performing the remote operations; each of the operation data signals including an Invoke Address signal for identifying the invoking Application Entity, and a Server Address signal for identifying the server Application Entity, whereby each of the operation data signals are directed to respective ones of the invoking server Application Entities identified by the Invoke Address and Server Address signals, a first one of the operation data signals being comprised of an invoke operation signal generated by the invoking Application Entity within the first one of the pair of communication systems and transmitted to the service Application Entity within the other of the pair of communication systems for invoking performance of a predetermined one of the remote operations via the service Application Entities.

BRIEF DESCRIPTION OF THE DRAWINGS

A better understanding of the present invention will be obtained with reference to the detailed description below in conjunction with the following drawings, in which.

DETAILED DESCRIPTION OF THE INVENTION

Figure 1:
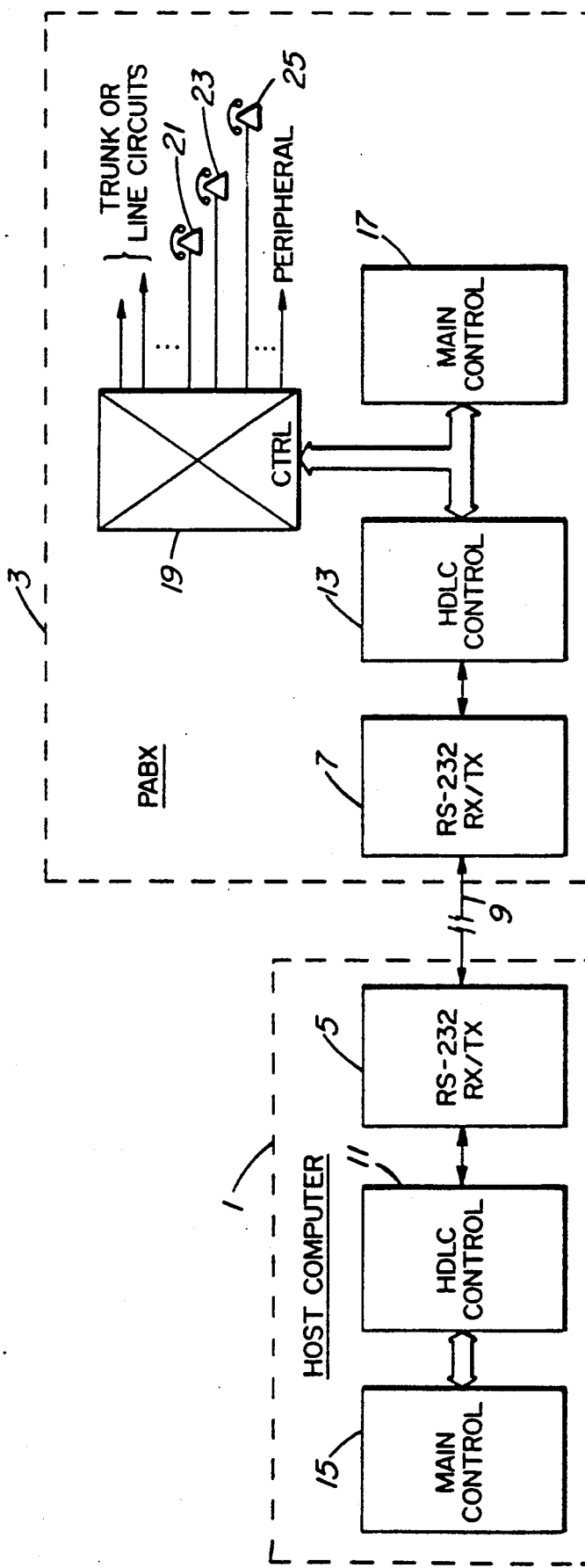
FIG. 1 is a block schematic diagram of a communication system in accordance with the present invention.

With reference to FIG. 1, a generalized conceptual block schematic diagram is shown of a communication system comprising a host computer 1 connected to a PABX 3.

In practice, the host computer 1 and PABX 3 will also be comprised of additional elements (e.g. terminals, memory, peripherals, etc.). Also, different computers and PABXs will embody different underlying physical structures for realizing the communication system. The host computer 1 and PABX 3 are connected via a standard RS-232 link connected to a pair of RS-232 receiver transmitters 5 and 7 disposed in the host computer 1 and PABX 3, respectively. The host computer 1 can be, for example, a VAX/VMS TM computer manufactured by Digital Equipment Corporation, and the PABX can be, for example, an SX 2000 TM digital PABX manufactured by Mitel Corporation. The RS-232 receiver/transmitters form the OSI physical communication layer, and the RS-232 link 9 carries synchronous data signals of from 1.2 kilobits per second up to 64 kilobits per second.

The RS-232 receiver/transmitters 5 and 7 are connected to respective link layer controllers, such as HDLC control circuits 11 and 13 respectively, for implementing an OSI link layer protocol (e.g. LAPB as defined in CCITT Recommendation X.25 (1984)).

Respective main controllers 15 and 17 are connected to the HDLC control circuits 11 and 13 respectively, for implementing the transport/session/presentation layers of the standard OSI communication protocol, as described in greater detail below.

The PABX 3 is further comprised of a switching exchange 19 such as a digital cross point switching matrix, and a plurality of line and trunk circuits, as well as other peripherals connected thereto. For example, a plurality of subscriber sets 21, 23, 25, etc. may be connected to cross point switching matrix 19 for establishing communication between respective subscribers under control of the main controller 17.

Similarly, a plurality of peripherals such as data terminals, LANs, etc. may be supported by the host computer 1 or PABX 3. Such additional peripherals are well known in the art, but do not form part of the present invention, and are not described in detail herein.

In operation, in order to invoke a predetermined Application layer remote operation, one of the main controllers (e.g. main controller 15 of the host computer 1) encodes an application layer message associated with a predetermined Application Entity, for transmission to and reception by a further Application Entity supported by the other main controller (e.g. main controller 17 of the PABX 3) for serving or performing an invoked application layer operation.

For example, in the event that it is desired to monitor the status of a predetermined telephone set (e.g. subscriber set 21) of the PABX 3 from the host computer 1, the following sequence of events are executed.

Firstly, the host computer 1 invokes a TRANSLATE procedure in order to obtain a Logical Equipment Identifier (LID) and other information relating to the subscriber set 21. A Logical Equipment Identifier (LID) is a PABX supplied value which references a PABX resource, such as a subscriber set, line circuit, trunk circuit, etc. These resources may be a single device in the case of a subscriber set, but may also be a logical construct such as a hunt group or multiple appearance group. The TRANSLATE operation is provided in order that the host computer may resolve an external address to a LID and obtain any synonyms for the address. The 03 TRANSLATE procedure also returns information which describes the type of PABX resource.

Appendix A illustrates the sequence of hexadecimal signals characterizing the application layer remote operation invocation generated by the host computer main controller 15.

The table shown in Appendix A, as well as the tables presented in Appendices B to J represent examples of remote operation invocations in accordance with the present invention. However, it will be understood that the structure and content of the OPDUs and their hexadecimal representations may vary as the protocol evolves.

As can be seen from Appendix A, the remote operation Invoke OPDU is structured in accordance with OSI recommendation X.410 , and is comprised of a sequence consisting of an Invoke 1D, Operation, and Argument. However, in addition to standard X.410 protocol, an invoke address field and server address field are defined within the argument sequence. In particular, according to the example, an Invoke Address of 50 (decimal) is generated by the application layer software within main controller 15 for designating the address of the Application Entity within the host computer 1 which is invoking the TRANSLATE procedure.

The server address field is null, indicating that the TRANSLATE operation is a self-contained transaction (in conformance with standard X.410 protocol). In other words, since the host computer 1 does not know which Application Entity on the PABX 3 will serve as the TRANSLATE request, the main controller 15 assigns a null server address. As described in detail below, the PABX 3 assigns a Server Address for identifying the PABX Application Entity which services the TRANSLATE procedure, and returns this address to the host computer 1 within the Result OPDU for the TRANSLATE procedure.

A number of input values can be specified for the TRANSLATE procedure, such as Directory Number (DN), PBX Resource Name, Physical Location Identifier (PLID), Trunk Number, and Logical Equipment ID Instance. In the example illustrated in Appendix A, only the directory number (i.e. DN=1201) is specified. The directory number uniquely identifies the particular PABX resource which, in this case, is the subscriber set 21 identified by directory number 1201.

The Intersect Translation (IntersectTrans) qualification of the Invoke OPDU for the TRANSLATE procedure is absent in the above example. The IntersectTrans qualifier is utilized by the invoking Application Entity to qualify the initial TRANSLATE input with a second input which causes the returned value in the Result OPDU to contain the intersection of the two inputs. For example, in the event that the TRANSLATE operation is invoked for a specific line on a multiline set (i.e. a multiple appearance line), the invoking Application Entity supplies the multiple appearance group directory number as the first input and the prime directory number of the set which has the specific line of interest as the Intersect TransType within the Invoke OPDU argument sequence. The server Application Entity within the PABX 3 then returns the LID for the desired line within the Result OPDU.

The hexadecimal code representation of the Invoke OPDU for the example outlined in Appendix A is seen to conform to the X.409 message signal format. In particular, the first two octets "A1 19" represent a context specific constructor identifier having an ID code of "1" and a length of 19 (hex) (i.e. 25 decimal) octets. The "30" and "17" octets designate a sequence of 23 (i.e. 17 hex) elements.

The first element of the Invoke OPDU sequence, according to the X.410 recommendation is the Invoke ID which specifies the invoke identifier assigned to the operation being invoked, for distinguishing one operation from another which the invoking Application Entity may have in progress at the invoked Application Entity. In accordance with standard X.410 protocol, the invoking Application Entity may begin to reuse an invoke identifier whenever it chooses (for example, after a fixed time interval), subject to the constraint that it may not reuse an identifier that was previously assigned to an invocation for which it expects but has not yet received a response.

The standard X.409 notation for an Invoke ID having a value of 300, is given in Appendix A as follows: "02 02 01 2C" designating an integer having a length of two octets and a value of 012C (hex) (i.e. 300 decimal).

The X.410 defined Operation Code value for the invoked TRANSLATE operation in accordance with a preferred embodiment of the present invention, is assigned a value of 3 (decimal). This is hexadecimally represented according to X.409 as an integer (designated by octet "02") having a length of 1 (designated by the octet "01") and value of "03".

The X.410 argument sequence is encoded hexadecimally as "30 OE", which designates a sequence of length 14 (decimal).

As discussed above, according to the present invention invoke and server address fields are defined in order to support asynchronous remote operations within the X.410 recommendation, for implementing telephony applications. The invoke address of 50 (decimal) is represented hexadecimally as "53" designating an application wide primitive having an ID code of 19 (decimal), (i.e. a tagged identifier in accordance with X.409), a length of "01" and a value of "32" (i.e. 50 decimal). Similarly, the server address is represented hexadecimally by "53 01 00" designating the null server address as discussed in detail above.

The input values to the TRANSLATE operation as discussed above, are represented by the trans-type element within the invoke argument sequence, which is defined according to the present invention using X.409 notation, as shown in Appendix B.

Therefore, the hexadecimal representation within the trans-type element for the chosen directory number is defined as follows: "81" designates a context specific primitive ID code for "Directory Number", having a length of "04" octets and a value of "31 32 33 31", or 1201 (decimal), wherein "33" is the numeric value of the ASCII code for the character "3".

The X.409 encoding utilized in the application layer message illustrated in Appendix A contains sufficient information to implement the presentation, session and transport OSI layers required to direct and reassemble the message (i.e. to invoke the remote TRANSLATE operation) at the PABX 3. In particular, the sender's address (invoke address) and the receiver's address (server address) are included within the invoke OPDU argument sequence to establish session layer addressing which allows the server Application Entity to route the application message to the appropriate invoking application. Also, normally within the session/transport layer according to OSI protocol, a length field (or some other framing mechanism) would be required to allow link layer frames to be correctly reassembled into application layer addresses. According to the X.409 encoding used in the presentation layer illustrated in Appendix A, the first length field in the message (i.e. following the X.410 OPDU identifier) is used by the session layer at the server Application Entity within the PABX 3 to assemble the invoke OPDU.

The fully encoded application layer message (including transport, session and presentation layer information) is transmitted from the main controller 15 and received by the HDLC control circuit 11 (FIG. 1). The HDLC control circuit 11 inserts the required link layer framing, error correction and retransmission information in a well known manner. For example, according to a successful prototype of the present invention the HDLC control circuit implemented LAPB as defined in the CCITT recommendation X.25 (1984).

Figure 2:
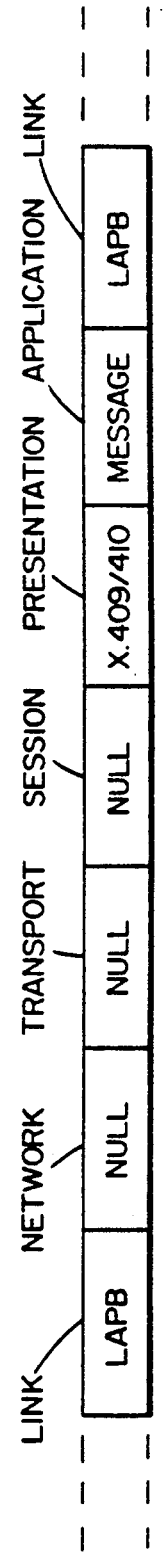
FIG. 2 is a block diagram showing link layer format in accordance with a preferred embodiment of the present invention.

Since all of the decoding and message routing information is incorporated within the application layer message itself, the layers between the link layer and the presentation layer may be left undefined, thereby allowing future communication protocols to be established utilizing these layers. In other words, according to the present invention, a point-to-point protocol is established in which each end of the link is responsible for handling the network layer requirements within its own network environment. Therefore, each of the network, transport and session layers are represented by a null (0) octet prefixed to the X.409/410 data being transmitted. Accordingly, the format of messages being transmitted between the HDLC controllers 11 and 13 and their respective RS-232 receiver/transmitters 5 and 7, is as shown with reference to FIG. 2.

The physical layer Invoke OPDU message is transmitted via receiver/transmitter 5 to the OSI physical layer medium which, as discussed above, is a standard RS-232 link 9. The physical layer message is received by RS-232 receiver 7 of PABX 3, and transmitted therefrom to HDLC control circuit 13 according to the format of FIG. 2. HDLC control circuit 13 decodes the link layer information and passes the network/transport/session/presentation/application layer data to the main controller 17.

Main controller 17 decodes the X.409/410, application layer message, assigns an Application Entity therein to service the invoked TRANSLATE operation, and in response returns a Result OPDU to the host computer 1 for acknowledging successful execution of the invoked procedure. The Result OPDU is shown in Appendix C.

The Result OPDU conforms generally to the X.410 specification. However, in addition, invoke address and server address fields are included within the Result Sequence. In particular, the invoke address for the example illustrated in Appendix B is 50 (decimal), for routing the Result OpDU to the invoking Application Entity of the host computer 1. Also, the server address is defined as 99 (decimal), for identifying the Application Entity within PABX 3 which serviced the TRANSLATE procedure.

As discussed above, the returned value from the TRANSLATE operation is a logical descriptor containing a Logical Equipment Identifier (LID) which is used in other application layer procedures within the PABX 3 to identify a predetermined PABX resource. In addition, a description of the resource is returned. Thus, in the event that the resource identified by the LID is a subscriber set, the Set Kind, its Directory Number, Name and PLID are also returned. In the event that the resource described by the LID is a trunk, the Trunk Number, Name, PLID and Type of trunk are returned. Furthermore, in the event that the resource is a route, the number of trunks in the trunk group associated with the route is returned. Additional resources which can be described by the LID in response to the TRANSLATE procedure, are as follows: Route List, Route plan, Hunt Group, Multicall Group and Key Line Group. Thus, the Result OPDU returned in connection with translation of the additional resources includes specific information indigenous to each.

Returning to the example illustrated in Appendices A and C, the returned LID is seen to be 32 (decimal) with a Directory Number having value 1201, a PABX resource name "Mary Called", a PLID for identifying the specific location of the resource hardware within the PABX 3 (i.e. rack and shelf location), as well as additional information concerning the kind of set (e.g. Mitel SS4 subscriber set) and attributes of the set (e.g. number of rows, 17 columns, display, etc.).

Using the LID (i.e. 32 decimal) obtained from the PABX 3, the Application Entity within the host computer 1 may then request that the identified telephone set (e.g. Directory Number 1201 belonging to Mary Called), be monitored, thereby causing the PABX 3 to generate a call status message to the host computer 1 every time the set changes state (i.e. from idle to dialling, route/determined, failed/call, connected, on/hold, etc.).

Therefore, an Application Entity within host computer 1 generates an Invoke OPDU for initiating a request to monitor the resource identified by the aforementioned translated LID (e.g. 32), as shown in Appendix D.

With reference to Appendix D, a new Invoke ID of 301 (decimal) is generated by the application software of main controller 15, for identifying the invoked MONITOR procedure. However, since the TRANSLATE procedure is a self-contained transaction, as discussed above, the previous invoke ID of 300 (decimal) could in fact be reused.

An Operation Code of 20 (decimal) is used to identify the MONITOR procedure, and an argument sequence is generated for specifying the LID obtained from the previous TRANSLATE procedure (i.e. 32 decimal), as well as any MONITOR filter information, as discussed in greater detail below. In addition, an invoke address of 51 (decimal) is generated to identify the invoking Application Entity within host computer 1, and a null server address is generated since the host computer 1 does not know which Application Entity within PABX 3 will service the request.

As discussed above, the MONITOR procedure is invoked from the host computer 1 in order to monitor the activity of a predetermined PABX resource. Invoking the MONITOR procedure results in the PABX 3 immediately sending a CALL STATUS message in relation to the monitored resource, subject to any specified filtering. The CALL STATUS message indicates the current state of the resource. However, no historic information is generated about any call which may be in progress. Hence, if the target resource is not currently in one of the call states specified by the MONITOR invoke procedure, then no call status message is immediately generated by the PABX 3, such that the first call status message will be generated and sent when the target resource enters the state which is being monitored.

With reference to the argument sequence of the MONITOR invoke message, the LID of 32 (decimal) identifies the subscriber set 21 (i.e. directory number 1201) to be monitored within PABX 3. The aforementioned MONITOR filter is a selector as to the type of call processing events that the host computer 1 is interested in. It is expressed as a bit string of call states followed by a Boolean flag indicating whether all call events are to be reported and a further Boolean flag indicating whether name information (if available) is to be given to the CALL STATUS messages.

In response to receiving the MONITOR invoke message containing the aforementioned filter states, PABX 3 then informs the host computer 1 only of activity corresponding to the specified filter states. The minimal set of call states to be able to determine whether a set is idle or engaged in some activity would be the states: idle, dialling, and seized.

As discussed above, the server address in the MONITOR Invoke OPDU is a null octet. Subsequent CALL STATUS messages generated from the PABX Application Entity are then directed to the host computer server address specified in the invoke address field of the MONITOR Invoke OPDU, as discussed in greater detail below.

As seen from Appendix D, all states, events, and name information are specified for being returned to the host computer 1 in subsequent PABX generated CALL STATUS messages.

The MONITOR Result OPDU returns only the invoke ID of 301 (decimal), and a result sequence comprised of the invoke address 51 (decimal) and a server address of (52).

As discussed above, a CALL STATUS message is always returned to the host computer 1 from the PABX 3 soon after a MONITOR is created. This provides the host computer Application Entity with the current state of the identified subscriber set as well as a list of features allowed by the set, the type of call in progress (if any), the other party's name and number and the LID identifying the monitored set. This procedure is also invoked by the PABX 3 for every state change of the device being monitored. As indicated above, the information elements included within the CALL STATUS message are subject to the filtering specified in the MONITOR Invoke OPDU argument sequence.

For example, in the event that the monitored set 21 is idle, PABX 3 generates a CALL STATUS invoke OPDU as shown in Appendix E.

With reference to Appendix E, a new Invoke ID of 303 (decimal) is generated by the main controller 17 of PABX 3, for identifying the particular CALL STATUS Invoke OPDU. An operation code of 23 (decimal) is generated in conformance with X.410 protocol, for identifying the CALL STATUS procedure. An argument sequence is generated, including an invoke address of 52 (decimal) for identifying the Application Entity within PABX 3 which generates the CALL STATUS messages, and a server address of 51 (decimal) corresponding to the Application Entity within host computer 1 which invoked the MONITOR procedure. Furthermore, an LID of 32 (decimal) is used to confirm the identity of subscriber set 21 as the set being monitored; and a Call Reference identifier (0) is generated indicating that there has been no state change within the monitored device. The Call Reference value is used in situations where actual calls are in progress. Hence, a device which is idle (such as in Appendix E) or unavailable, would have a call reference value of 0.

The Call Reference value is needed to distinguish between instances of calls on the same LID. It is possible that due to glare situations, the monitored device may have abandoned one call and started another before the host computer 1 is informed. Thus, for example, if the host computer 1 sends an Invoke Call procedure for the first call, the PABX 3 will return an Error OPDU because the Call reference used would have been the old one.

The MONITOR server address (e.g. 51 decimal) remains the same during the entire MONITOR session, but the Call Reference value changes each time the device enters the dialling state without a consultation-hold party (or when the device enters a seized state). Also, a new Call Reference value is generated whenever a device enters a call when the device was previously in either the idle, key-line-active, or unavailable states. Therefore, the use of the Call Reference value ensures that the INVOKE CALL function (described in greater detail below) operates on the expected instance of the call.

A queue position value of 0 is generated by the Application Entity invoking CALL STATUS within PABX 3 for indicating that no other call is queued at the monitored device. This field may not be used in all cases. It is primarily intended for data calls where the current position in the queue is quite valuable since the queue may be large. Generally, voice calls which are queued normally specify a value of "0" unless the set is part of an ACD (Automatic Call Distribution) application.

A Call State value of 1 is generated by the Application Entity to indicate that telephone set 21 is idle. A Call Event value of 0 is generated indicating a "nil-call-event", a Call Type value of 0 is generated indicating a "nil-call-type", and allowed features implemented on subscriber set 21 are indicated as being "redial".

In the event the Call Type is nil-call-type, there is no special call-type information that needs to be communicated to the host computer 1. Hence, the call state and call event values provide sufficient information for the host computer 1 to assess call status. The PABX 3 may supply party information if it wishes to ensure that the party information is updated with correct data.

The nil call event is used when a CALL STATUS message is first sent in response to a MONITOR, and there is no event information to report.

The Features Allowed value is in the form of a bit map that indicates the features that can be invoked in the current call state. This is helpful for displaying an accurate menu for the call to a user located at a terminal connected to host computer 1. The Features Allowed in each state will vary from one PABX to another, but are expected to have a general representation.

Normally, according to X.410 protocol the host computer 1 will return a result OPDU in response to receiving the CALL STATUS message from PABX 3. However, according to the present invention, a return result OPDU is not defined for the CALL STATUS message. The reason for this is that CALL STATUS messages are expected to account for the highest percent of link traffic. It was decided not to risk burdening the PABX 3 main controller 17 by forcing it to handle receiving return results for the invoked call status operations since any returned result OPDU would contain no useful information for the PABX 3.

In the event that a caller from a further extension (e.g. Joe Caller at subscriber set 23, corresponding to directory number 1200), is trying to call directory number 1201, the PABX 3 sends another CALL STATUS message indicating that the subscriber set identified by LID 32 has changed from an idle to a seized state, as well as information as to who is calling, as outlined in Appendix F.

In particular, the CALL STATUS message described with reference to Appendix F indicates that LID 32 is characterized by a call state value of 5 (decimal) indicating that it is in the seized condition, due to an incoming call identified by a Call Reference value of 638 (decimal). The Call Event is specified as being a new call, and the Call Type is defined as being nil-call-type.

The allowed features for subscriber set 21 at this point are answer and redirect. In other words, the call options available to Mary Called at the instance considered in the example of Appendix F are for her to answer the phone, or in the event of a time-out due to the phone not being answered, to redirect the call to a programmed call forward location.

In addition, the CALL STATUS message includes information concerning the party calling subscriber set 21. More particularly the Directory Number of the calling extension is identified as 1200 (i.e subscriber set 23 in FIG. 1), and the name of the party is identified as Joe Caller.

In the event that Mary Called answers her telephone, subscriber set 21 changes from the seized state to a connected state, in which both parties are free to talk to one another. Accordingly, PABX 3 generates a further CALL STATUS message to the host computer 1, as illustrated in Appendix G.

The CALL STATUS information provided by the message sequence of Appendix G, can be summarized as follows:

```
CALL-STATUS =
logical-equipment-id:    32
call-reference:          638
queue-position:          0
call-state:              CONNECTED
call-event:              answer-invoked
call-type:               two-party-call
features-allowed:        cons-hold + disconnect +
                         call-hold
other-party-name:        CALLER, JOE
other-party-ext:         1200
third-party-name:
third-party-ext:
```

In the event that one of either Joe Caller or Mary Called goes on-hook, subscriber set 21 changes from the connected state to the idle state and a further CALL STATUS message is generated by PABX 3 as shown in Appendix H.

The CALL STATUS information provided by the message sequence in Appendix H, can be summarized as follows:

```
CALL-STATUS =
logical-equipment-id:    32
call-reference:          0
queue-position:          0
call-state:              IDLE
call-event:              this-party-on-hook
call-type:               nil-call-type
features-allowed:        redial
other-party-name:
other-party-ext:
third-party-name:
third-party-ext:
```

In the event that the host computer Application Entity which has invoked the MONITOR procedure wishes to terminate further monitoring of subscriber set 21, it will send a STOP MONITOR message to PABX 3, as shown in Appendix I.

The simplistic example discussed above with reference to Appendices A to I represents a particularly simple scenario for illustrating the principles of the present invention. However, many more elaborate and sophisticated applications may be accommodated according to the present invention. For example, in addition to the TRANSLATE, MONITOR, CALL STATUS, and STOP MONITOR remote procedures, a plurality of additional telephony and control procedures may be implemented. For example, an INITIATE CALL procedure may be invoked from the host computer 1 to proxy a call from a predetermined PABX resource (such as subscriber set 21) to a predetermined destination on behalf of the identified resource. Similarly, the host computer 1 may clear a call that is in progress within PABX 3.

In addition to the MONITOR and STOP MONITOR procedures discussed above, an INTERROGATE-MONITOR MONITOR procedure may be invoked by application entities on either the PABX 3 or host computer 1 to determine the status of an invoked MONITOR procedure in the remote Application Entity. For instance, if no CALL STATUS messages have been received for a particular device over a predetermined period of time, one of either the PABX 3 or host computer 1 may wish to verify that there is indeed a MONITOR procedure active for the specified device.

Furthermore, the host computer 1 may invoke a procedure to activate a feature within PABX 3 on behalf of a call referenced by a predetermined call reference number by utilizing an INVOKE CALL FUNCTION procedure. Also, either of the host or PABX may invoke a program feature to allow the invoking Application Entity to program or deprogram a feature on behalf of the target entity (i.e. the server). Thus, the host computer 1 can utilize this procedure to program a PABX feature. Alternatively, the PABX 3 may utilize this feature to program a host feature.

Moreover, a plurality of device control procedures may be implemented, by which the host computer 1 may seize a predetermined subscriber set, write to its display and receive key strokes from the set. The sets can be seized in either a shared or exclusive mode. In the shared mode, the PABX 3 may assume control of the device from the host Application Entity if the set is required for telephony operations. For example, in the event that the subscriber set 25 goes off hook while a host Application Entity is using the set, the PABX 3 will notify the host computer 1 that it no longer has control of the set. In exclusive mode, the predetermined set will be treated as busy from the point of view of the PABX.

In addition, application control procedures may be implemented to allow true OSI applications level integration between special subscriber sets and applications residing on the host computer 1. These control procedures allow the host computer 1 to identify applications in the PABX 3 and to define an access mechanism to these applications which are in turn presented to a user of the special telephone subscriber set.

For example, the host computer 1 which is supplying an application, makes the application known to the PABX 3 by means of generating and transmitting a DEFINE ApPLICATION message. The PABX 3 makes the application known to the user of the subscriber set by displaying an appropriate soft key at the subscriber set, or making a feature access code available, or by some other set specific means. The PABX 3 then notifies the host computer 1 in the event that the user invokes the application. The host computer 1 may then interact with the subscriber set in the same way as it would with a simple terminal device, using the device control procedures outlined above (i.e. seize set, write to display, receive key strokes, etc.). Once the host computer 1 has terminated the application, it releases the predetermined set for normal usage.

Thus, for example, a text messaging system established on host computer 1 may be extended to S allow users of subscriber sets within PABX 3 to read their messages on display type telephones.

Various examples of such additional remote operations are described in detail in Appendix J.

In summary, implementations of remote operations are established by means of the present invention in conformance with OSI Standard Recommendations X409 and X410. However, in order to accommodate the asynchronous nature of telephony events, invoke address and server address fields are established within the argument and result sequences of Invoke and Result OPDUs respectively. Thus, remote operations are supported according to the present invention, in which the server Application Entity retains memory about an ongoing operation, in contrast with the standard X.410 recommendation in which all procedures are defined as memoryless, self-contained transactions.

For example, in the case of the MONITOR procedure discussed in detail above, there may be more than one simultaneous MONITOR active on a given LID. Thus, the server address which is returned in the Result OPDU must be unique to the instance of that operation at the server Application Entity. Hence, each MONITOR procedure is provided with a server address which allows the PABX 3 to identify the specific instance of the MONITOR. The PABX 3 may allocate MONITOR server addresses uniquely across a given LID but not necessarily uniquely across monitors on a different LID. Hence, the combination of a server address and LID must resolve to a specific instance Of a MONITOR at the PABX 3. Therefore, the host computer 1 must use this server address in any subsequent messages directed to the PABX 3 in reference to the operation invoked, such as STOP MONITOR procedure.

A person understanding the present invention may conceive of other embodiments or variations therein. For example, while the physical link 9 was discussed as being an RS-232 link, it is contemplated that a PCM communication link or other medium may be utilized to effect communication between invoke and server application entities in accordance with OSI physical layer protocol.

Also, it is possible that the Invoke and Server Address fields may be removed from the application layer and placed in a session layer of their own, while maintaining the same purpose and function as described herein.

Furthermore, while the preferred embodiment discussed herein relates to remote operations established between a computer and a PABX, it is contemplated that such operations may be established between two PABXs or two host computers, in accordance with the principles of the present invention.

Moreover, while the examples discussed above relate to a very simple telephony arrangement involving a pair of subscriber sets, in a typical implementation of the present invention the telephony environment would be comprised of many hundreds of subscriber sets, line and trunk circuits, data terminals, etc.

All such variations and modifications are believed to be within the sphere and scope of the present invention as defined in the claims appended hereto.

APPENDIX A

| | | |
|---|---|---|
| A1 19 30 17 | Invoke OPDU | Sequence |
| 02 02 01 2C | InvokeId............. | Word(300) |
| 02 01 03 | OperationCode........ | Word(3) |
| | Operation Is | Translate |
| 30 0E | Argument | Sequence |
| 7E 06 | Addressing | Addressing |
| | DataLost | ABSENT |
| 53 01 32 | InvokeAddr........... | Address(50) |
| 53 01 00 | ServerAddr........... | Address(0) |
| 81 04 | Trans | TransType |
| | Dn | DirectoryNumber |
| 31 32 30 31 | ..................... | Value: 1 2 0 1 |
| | IntersecTrans | ABSENT |

APPENDIX B

| Trans-type | ::= CHOICE | |
|---|---|---|
| { plid | [0] IMPLICIT Physical-location-id, | -- ID = A0 |
| dn | [1] IMPLICIT Directory-number, | -- ID = 81 |
| name | [2] IMPLICIT Pbx-resource-name, | -- ID = A2 |
| instance | [3] IMPLICIT Lid-instance, | -- ID = A3 |
| trunk-num | [4] IMPLICIT Trunk-number, | -- ID = 84 |
| user-name | [5] IMPLICIT Pbx-resource-name | -- ID = A5 |
| ars-code | [6] IMPLICIT Directory-number | -- ID = 86 |
| } | | |

APPENDIX C

| | | | |
|---|---|---|---|
| A2 6A 30 68 | Result OPDU | | Sequence |
| 02 02 01 2C | InvokeId.................... | | Word(300) |
| | Operation Is>>>>>>>>>>>>>>>>> | | Translate<<<<<<<<<<<< |
| 30 62 | Result | | Sequence |
| 7E 06 | Addressing | | Addressing |
| | DataLost | | ABSENT |
| 53 01 32 | InvokeAddr................. | | Address(50) |
| 53 01 63 | ServerAddr................. | | Address(99) |
| 66 58 | Desc | | LogicalDesc |
| 54 01 20 | Lid......................... | | Lid(32) |
| A0 53 | Info | | LogicalDevInfo |
| | VoicesetInfo | | VoicesetInfo |
| 30 30 | SetInfo | | SetInfo |
| 55 04 | Dn | | DirectoryNumber |
| 31 32 30 31 | ..................... | | Value: 1 2 0 1 |
| 76 0E | . Name | | PbxResourceName |
| 80 06 | Surname | | VisibleString |
| 43 41 4C 4C | ..................... | | Value: C A L L |
| 45 44 | | | E D |
| 81 04 | FirstName | | VisibleString |
| 4D 41 52 59 | ..................... | | Value: M A R Y |
| | Initial | | ABSENT |
| 6E 18 | Plid | | Plid |
| 50 01 04 | NoLevels................... | | Byte(4) |
| 50 01 01 | Level1..................... | | Byte(1) |
| 50 01 04 | Level2..................... | | Byte(4) |

APPENDIX C

| | | | |
|---|---|---|---|
| 50 01 13 | | Level3...................... | Byte(19) |
| 50 01 06 | | Level4...................... | Byte(6) |
| 50 01 00 | | Level5...................... | Byte(0) |
| 50 01 00 | | Level6...................... | Byte(0) |
| 50 01 00 | | Level7...................... | Byte(0) |
| 6B 1C | Set | | DeviceClass |
| 63 06 | Kind | | SetKind |
| 50 01 02 | | Manuf | Manufacturer |
| | | Mitel...................... | Value (2) |
| 50 01 15 | | Type | SetType |
| | | SS 4........................ | Value (21) |
| 6A 12 | Attribs | | SetAttribs |
| 50 01 01 | | NumRows............. | Byte(1) |
| 50 01 10 | | NumCols............. | Byte(16) |
| 50 01 02 | | DispType | DisplayType |
| | | Vdu........................ | Value (2) |
| 50 01 0C | | NumDtmf............ | Byte(12) |
| 50 01 06 | | NumSpecialKeys...... | Byte(6) |
| 50 01 06 | | NumSpecialDisp...... | Byte(6) |
| 01 01 0F | IsAPrimeLine | | Boolean |
| | TRUE........................ | | Value (15) |

APPENDIX D

| | | | |
|---|---|---|---|
| A1 23 30 21 | Invoke OPDU | | Sequence |
| 02 02 01 2D | InvokeId.................... | | Word(301) |
| 02 01 14 | OperationCode............... | | Word(20) |
| | Operation Is>>>>>>>>>>>>>>>> | | Monitor<<<<<<<<<<<< |
| 30 18 | Argument | | Sequence |
| 7E 06 | Addressing | | Addressing |
| | DataLost | | ABSENT |
| 53 01 33 | | InvokeAddr.................. | Address(51) |
| 53 01 00 | | ServerAddr.................. | Address(0) |
| 54 01 20 | Lid........................ | | Lid(32) |
| 7B 0B | Filter | | MonitorFilter |
| 03 03 | | States | BitStrCallState |
| 01 FF FF | | NilState, Idle, Dialing, RouteDetermined, FailedCall, Seized, Connected, KeylineActive, OnHold, CallQueued, Unavailable, LastCallState | |
| 01 01 01 | | Events | Boolean |
| | | TRUE........................ | Value (1) |
| 01 01 01 | | NameInfo | Boolean |
| | | TRUE........................ | Value (1) |
| A2 10 30 0E | Result OPDU | | Sequence |
| 02 02 01 2D | InvokeId.................... | | Word(301) |
| | Operation Is>>>>>>>>>>>>>>>> | | Monitor<<<<<<<<<<<< |
| 30 08 | Result | | Sequence |
| 7E 06 | Addressing | | Addressing |
| | DataLost | | ABSENT |
| 53 01 33 | | InvokeAddr.................. | Address(51) |
| 53 01 34 | | ServerAddr.................. | Address(52) |

APPENDIX E

| | | | |
|---|---|---|---|
| A1 20 30 2A | Invoke OPDU | | Sequence |
| 02 02 01 2F | InvokeId.................... | | Word(303) |
| 02 01 17 | OperationCode............... | | Word(23) |
| | Operation Is>>>>>>>>>>>>>>>> | | Monitor<<<<<<<<<<<< |
| 30 21 | Argument | | Sequence |
| 7E 06 | Addressing | | Addressing |
| | DataLost | | ABSENT |
| 53 01 34 | | InvokeAddr.................. | Address(52) |
| 53 01 33 | | ServerAddr.................. | Address(51) |
| 54 01 20 | Lid........................ | | Lid(32) |
| 58 01 00 | CallRef | | CallReferenceNo |
| | | | Value (0) |
| 51 01 00 | QueuePos.................... | | Word(0) |
| 50 01 00 | CallState | | CallState |
| | Idle........................ | | Value (1) |
| 50 01 00 | CallEvent | | CallEvent |
| | NilCallEvent............... | | Value (0) |
| 50 01 00 | CallType | | CallType |
| | NilCallType................ | | Value (0) |
| 4C 03 | FeatAllowed | | FeaturesAllowed |

-continued
APPENDIX E

| | | | |
|---|---|---|---|
| 00 00 01 | Redial | | |
| 30 00 | OtherParties | OtherPartiesInfo | |
| | OtherParty | ABSENT | |
| | ThirdParty | ABSENT | |
| | MeterPulseCnt | ABSENT | |

APPENDIX F

| | | |
|---|---|---|
| A1 43 30 41 | Invoke OPDU | Sequence |
| 02 02 01 2F | InvokeId | Word(304) |
| 02 01 17 | OperationCode | Word(23) |
| | Operation Is>>>>>>>CallStatus<<<< | |
| 30 38 | Argument | Sequence |
| 7E 06 | Addressing | Addressing |
| | DataLost | ABSENT |
| 53 01 34 | InvokeAddr | Address(52) |
| 53 01 33 | ServerAddr | Address(51) |
| 54 01 20 | Lid | Lid(32) |
| 58 02 02 7E | CallRef | CallReferenceNo |
| | | Value (638) |
| 51 01 00 | QueuePos | Word(0) |
| 50 01 05 | CallState | CallState |
| | Seized | Value (5) |
| 50 01 30 | CallEvent | CallEvent |
| | NewCall | Value (48) |
| 50 01 00 | CallType | CallType |
| | NilCallType | Value (0) |
| 4C 02 | FeatAllowed | FeaturesAllowed |
| 00 50 | Answer, RedirectCall | |
| 30 17 | OtherParties | OtherPartiesInfo |
| A0 15 | OtherParty | PartyInfo |
| 80 04 | Number | PartyNumber |
| | VoiceExt | DirectoryNumber |
| 31 32 30 30 | | Value: 1 2 0 0 |
| 76 0D | Name | PbxResourceName |
| 80 06 | Surname | VisibleString |
| 43 41 4C 4C | | Value: C A L L |
| 45 52 | | E R |
| 81 03 | FirstName | VisibleString |
| 4A 4F 45 | | Value: J O E |
| | Initial | ABSENT |
| | ThirdParty | ABSENT |
| | MeterPulseCnt | ABSENT |

APPENDIX G

| | | |
|---|---|---|
| A1 45 30 43 | Invoke OPDU | Sequence |
| 02 02 01 30 | InvokeId | Word(305) |
| 02 01 17 | OperationCode | Word(23) |
| | Operation Is>>>>>>>CallStatus<<<< | |
| 30 3A | Argument | Sequence |
| 7E 06 | Addressing | Addressing |
| | DataLost | ABSENT |
| 53 01 34 | InvokeAddr | Address(52) |
| 53 01 33 | ServerAddr | Address(51) |
| 54 01 20 | Lid | Lid(32) |
| 58 02 02 7E | CallRef | CallReferenceNo |
| | | Value (638) |
| 51 01 00 | QueuePos | Word(0) |
| 50 01 06 | CallState | CallState |
| | Connected | Value (6) |
| 50 01 02 | CallEvent | CallEvent |
| | AnswerInvoked | Value (2) |
| 50 01 18 | CallType | CallType |
| | TwoPartyCall | Value (24) |
| 4C 04 | FeatAllowed | FeaturesAllowed |

APPENDIX G-continued

| | | |
|---|---|---|
| 00 00 10 24 | ConsHold, Disconnect, CallHold | |
| 30 17 | OtherParties | OtherPartiesInfo |
| A0 15 | OtherParty | PartyInfo |
| 80 04 | Number | PartyNumber |
| | VoiceExt | DirectoryNumber |
| 31 32 30 30 | | Value: 1 2 0 0 |
| 76 0D | Name | PbxResourceName |
| 80 06 | Surname | VisibleString |
| 43 41 4C 4C | | Value: C A L L |
| 45 52 | | E R |
| 81 03 | FirstName | VisibleString |
| 4A 4F 45 | | Value: J O E |
| | Initial | ABSENT |
| | ThirdParty | ABSENT |
| | MeterPulseCnt | ABSENT |

APPENDIX H

| | | |
|---|---|---|
| A1 2C 30 2A | Invoke OPDU | Sequence |
| 02 02 01 31 | InvokeId | Word(306) |
| 02 01 17 | OperationCode | Word(23) |
| | Operation Is>>>>>>>CallStatus<<<< | |
| 30 21 | Argument | Sequence |
| 7E 06 | Addressing | Addressing |
| | DataLost | ABSENT |
| 53 01 34 | InvokeAddr | Address(52) |
| 53 01 33 | ServerAddr | Address(51) |
| 54 01 20 | Lid | Lid(32) |
| 58 01 00 | CallRef | CallReferenceNo |
| | | Value (0) |
| 51 01 00 | QueuePos | Word(0) |
| 50 01 01 | CallState | CallState |
| | Idle | Value (1) |
| 50 01 42 | CallEvent | CallEvent |
| | ThisPartyOnHook | Value (66) |
| 50 01 00 | CallType | CallType |
| | NilCallType | Value (0) |
| 4C 03 | FeatAllowed | FeaturesAllowed |
| 00 00 01 | Redial | |
| 30 00 | OtherParties | OtherPartiesInfo |
| | OtherParty | ABSENT |
| | ThirdParty | ABSENT |
| | MeterPulseCnt | ABSENT |

APPENDIX I

| | | |
|---|---|---|
| A1 16 30 14 | Invoke OPDU | Sequence |
| 02 02 01 2D | InvokeId | Word(307) |
| 02 01 15 | OperationCode | Word(21) |
| | Operation Is>>>>>>>StopMonitor<<<< | |
| 03 0B | Argument | Sequence |
| 7E 06 | Addressing | Addressing |
| | DataLost | ABSENT |
| 53 01 33 | InvokeAddr | Address(51) |
| 53 01 34 | ServerAddr | Address(52) |
| 54 01 20 | Lid | Lid(32) |

APPENDIX J
Error Recovery

| | | | | |
|---|---|---|---|---|
| | | | Interrogate HCI | |
| A1 | 12 | 30 | 10 | Invoke OPDU | Sequence |
| 02 | 01 | | 65 | InvokeId | Word(101) |
| 02 | 01 | | 01 | OperationCode | Word(1) |

-continued

APPENDIX J

| | | | | | |
|---|---|---|---|---|---|
| 30 | 08 | | | Operation Is>>>>>>>>>>>>>>>> Argument | InterrogateHci<<<<<<<<<<< Sequence |
| 7E | 06 | | | Addressing | Addressing |
| | | | | DataLost | ABSENT |
| 53 | 01 | 14 | | InvokeAddr.................. | Address(20) |
| 53 | 01 | 00 | | ServerAddr.................. | Address(0) |
| A2 | 21 | 30 | 1F | Result OPDU | Sequence |
| 02 | 01 | 65 | | InvokeId.................. | Word(101) |
| | | | | Operation Is>>>>>>>>>>>>>>> | InterrogateHci<<<<<<<<<<< |
| 30 | 1A | | | Result | Sequence |
| 7E | 06 | | | Addressing | Addressing |
| | | | | DataLost | ABSENT |
| 53 | 01 | 14 | | InvokeAddr.................. | Address(20) |
| 53 | 01 | 63 | | ServerAddr.................. | Address(99) |
| 6F | 10 | | | Status | HciStatus |
| 50 | 01 | 01 | | Version..................... | Byte(1) |
| 50 | 01 | 00 | | Edition.................... | Byte(0) |
| A0 | 08 | | | PackagesSupporte PBXSupported | Packages PBXPackages |
| 80 | 00 | | | BasicTelephony | Null |
| 81 | 00 | | | AdvancedTelephon | Null |
| 82 | 00 | | | DeviceControl | Null |
| 83 | 00 | | | ApplicationContr | Null |
| | | | | IpMessage | ABSENT |
| | | | | Logging | ABSENT |
| | | | | AdvancedFeatures | ABSENT |
| | | | | Reset HCI | |
| A1 | 12 | 30 | 10 | Invoke OPDU | Sequence |
| 02 | 01 | 66 | | InvokeId.................. | Word(102) |
| 02 | 01 | 02 | | OperationCode.............. | Word(2) |
| | | | | Operation Is>>>>>>>>>>>>>>> | ResetHci<<<<<<<<<<< |
| 30 | 08 | | | Argument | Sequence |
| 7E | 06 | | | Addressing | Addressing |
| | | | | DataLost | ABSENT |
| 53 | 01 | 14 | | InvokeAddr.................. | Address(20) |
| 53 | 01 | 00 | | ServerAddr.................. | Address(0) |
| A2 | 0F | 30 | 0D | Result OPDU | Sequence |
| 02 | 01 | 66 | | InvokeId.................. | Word(102) |
| | | | | Operation Is>>>>>>>>>>>>>>> | ResetHci<<<<<<<<<<< |
| 30 | 08 | | | Result | Sequence |
| 7E | 06 | | | Addressing | Addressing |
| | | | | DataLost | ABSENT |
| 53 | 01 | 14 | | InvokeAddr.................. | Address(20) |
| 53 | 01 | 63 | | ServerAddr.................. | Address(99) |
| | | | | Basic Telephony | |
| | | | | Initiate Call | |
| A1 | 44 | 30 | 42 | Invoke OPDU | Sequence |
| 02 | 01 | 6E | | InvokeId.................. | Word(110) |
| 02 | 01 | 0A | | OperationCode.............. | Word(10) |
| | | | | Operation Is>>>>>>>>>>>>>>> | InitiateCall<<<<<<<<<<< |
| 30 | 3A | | | Argument | Sequence |
| 7E | 06 | | | Addressing | Addressing |
| | | | | DataLost | ABSENT |
| 53 | 01 | 14 | | InvokeAddr.................. | Address(20) |
| 53 | 01 | 00 | | ServerAddr.................. | Address(0) |
| 54 | 01 | 16 | | SourceDevice............... | Lid(22) |
| A0 | 18 | | | Destination Plid | TransType Plid |
| 50 | 01 | 07 | | NoLevels.................... | Byte(7) |
| 50 | 01 | 07 | | Level1...................... | Byte(7) |
| 50 | 01 | 03 | | Level2...................... | Byte(3) |
| 50 | 01 | 09 | | Level3...................... | Byte(9) |
| 50 | 01 | 0A | | Level4...................... | Byte(10) |
| 50 | 01 | 0B | | Level5...................... | Byte(11) |
| 50 | 01 | 0C | | Level6...................... | Byte(12) |
| 50 | 01 | 0D | | Level7...................... | Byte(13) |
| 7D | 09 | | | AccountCode | AccountCode |
| 01 | 01 | 00 | | Verify FALSE..................... | Boolean Value (0) |
| 55 | 04 | | | Code | DirectoryNumber |
| 31 | 32 | 33 | 34 | ......................... | Value: 1 2 3 4 |
| 1A | 08 | | | CallerId | VisibleString |
| 50 | 2E | 48 | 4F | ......................... | Value: P . H O |
| 57 | 41 | 52 | 44 | | W A R D |
| A2 | 0F | 30 | 0D | Result OPDU | Sequence |
| 02 | 01 | 6E | | InvokeId.................. | Word(110) |
| | | | | Operation Is>>>>>>>>>>>>>>> | InitiateCall<<<<<<<<<<< |
| 30 | 08 | | | Result | Sequence |
| 7E | 06 | | | Addressing | Addressing |
| | | | | DataLost | ABSENT |

-continued

APPENDIX J

```
53  01  14            InvokeAddr..................     Address(20)
53  01  6E            ServerAddr..................    Address(110)
A1  1B  30  19  Invoke OPDU                            Sequence
02  01  64            InvokeId....................     Word(100)
02  01  0A            OperationCode...............     Word(10)
                      Operation Is>>>>>>>>>>>>>>>>>    InitiateCall<<<<<<<<<<<
30  11                Argument                         Sequence
7E  06                    Addressing                       Addressing
                              DataLost                         ABSENT
53  01  14                InvokeAddr..................        Address(20)
53  01  00                ServerAddr..................        Address(0)
54  01  16            SourceDevice................     Lid(22)
81  04                Destination                      TransType
                          Dn                               DirectoryNumber
31  32  33  34            ............................         Value: 1 2 3 4
                      AccountCode                      ABSENT
                      CallerId                         ABSENT
A1  28  30  26  Invoke OPDU                            Sequence
02  01  66            InvokeId....................     Word(102)
02  01  0A            OperationCode...............     Word(10)
                      Operation Is>>>>>>>>>>>>>>>>>    InitiateCall<<<<<<<<<<<
30  1E                Argument                         Sequence
7E  06                    Addressing                       Addressing
                              DataLost                         ABSENT
53  01  14                InvokeAddr..................        Address(20)
53  01  00                ServerAddr..................        Address(0)
54  01  16            SourceDevice................     Lid(22)
A3  06                Destination                      TransType
                          Instance                         LidInstance
54  01  10                Lid.........................        Lid(16)
51  01  11                Instance....................        Word(17)
7D  09                AccountCode                      AccountCode
01  01  01                Verify                           Boolean
                              TRUE.......................         Value (1)
55  04                Code                             DirectoryNumber
31  32  33  34            ............................        Value: 1 2 3 4
                      CallerId                         ABSENT
A1  23  30  21  Invoke OPDU                            Sequence
02  01  67            InvokeId....................     Word(103)
02  01  0A            OperationCode...............     Word(10)
                      Operation Is>>>>>>>>>>>>>>>>>    InitiateCall<<<<<<<<<<<
30  19                Argument                         Sequence
7E  06                    Addressing                       Addressing
                              DataLost                         ABSENT
53  01  14                InvokeAddr..................        Address(20)
53  01  00                ServerAddr..................        Address(0)
54  01  16            SourceDevice................     Lid(22)
84  01                Destination                      TransType
10                        Trkno.......................     Word(16)
7D  09                AccountCode                      AccountCode
01  01  01                Verify                           Boolean
                              TRUE.......................         Value (1)
55  04                Code                             DirectoryNumber
31  32  33  34            ............................        Value: 1 2 3 4
                      CallerId                         ABSENT
                Clear Call
A1  15  30  13  Invoke OPDU                            Sequence
02  01  6F            InvokeId....................     Word(111)
02  01  0B            OperationCode...............     Word(11)
                      Operation Is>>>>>>>>>>>>>>>>>    ClearCall<<<<<<<<<<<
30  0B                Argument                         Sequence
7E  06                    Addressing                       Addressing
                              DataLost                         ABSENT
53  01  14                InvokeAddr..................        Address(20)
53  01  6E                ServerAddr..................        Address(110)
54  01  06            Lid.........................     Lid(6)
A2  0F  30  0D  Result OPDU                            Sequence
02  01  6F            InvokeId....................     Word(111)
                      Operation Is>>>>>>>>>>>>>>>>>    ClearCall<<<<<<<<<<<
30  08                Result                           Sequence
7E  06                    Addressing                       Addressing
                              DataLost                         ABSENT
53  01  14                InvokeAddr..................        Address(20)
53  01  6E                ServerAddr..................        Address(110)
                Interrogate Monitor
A1  15  30  13  Invoke OPDU                            Sequence
02  01  7A            InvokeId....................     Word(122)
02  01  16            OperationCode...............     Word(22)
                      Operation Is>>>>>>>>>>>>>>>>>    InterrogateMonit<<<<<<<<<<<
30  0B                Argument                         Sequence
```

APPENDIX J

| | | | | |
|---|---|---|---|---|
| 7E | 06 | | Addressing | Addressing |
| | | | DataLost | ABSENT |
| 53 | 01 | 16 | InvokeAddr.................. | Address(22) |
| 53 | 01 | 78 | ServerAddr.................. | Address(120) |
| 54 | 01 | 0A | Lid.......................... | Lid(10) |
| A2 | 1F | 30 | 1D Result OPDU | Sequence |
| 02 | 01 | 7A | InvokeId................... | Word(122) |
| | | | Operation Is>>>>>>>>>>>>>>> | InterrogateMonit<<<<<<<<<<< |
| 30 | 18 | | Result | Sequence |
| 7E | 06 | | Addressing | Addressing |
| | | | DataLost | ABSENT |
| 53 | 01 | 16 | InvokeAddr.................. | Address(22) |
| 53 | 01 | 78 | ServerAddr.................. | Address(120) |
| 54 | 01 | 0A | Lid.......................... | Lid(10) |
| 7B | 0B | | Filter | MonitorFilter |
| 03 | 03 | | States | BitStrCallState |
| 00 | FF | FF | NilState, Idle, Dialing, RouteDetermined, FailedCall, Seized, Connected KeylineActive, OnHold, CallQueued, Unavailable, LastCallState | |
| 01 | 01 | 01 | Events | Boolean |
| | | | TRUE...................... | Value (1) |
| 01 | 01 | 01 | NameInfo | Boolean |
| | | | TRUE...................... | Value (1) |
| | | | Invoke Call Function | |
| A1 | 21 | 30 | 1F Invoke OPDU | Sequence |
| 02 | 01 | 7C | InvokeId................... | Word(124) |
| 02 | 01 | 18 | OperationCode............... | Word(24) |
| | | | Operation Is>>>>>>>>>>>>>>> | InvokeCallFuncti<<<<<<<<<<< |
| 30 | 17 | | Argument | Sequence |
| 7E | 06 | | Addressing | Addressing |
| | | | DataLost | ABSENT |
| 53 | 01 | 18 | Invoke Addr.................. | Address(24) |
| 53 | 01 | 00 | Server Addr.................. | Address(0) |
| 54 | 01 | 08 | Lid.......................... | Lid(8) |
| 58 | 01 | 28 | CallRef | CallReferenceNo |
| | | | .......................... | Value (40) |
| 50 | 01 | 02 | Feature | FeatureType |
| | | | Music...................... | Value (2) |
| 80 | 04 | | Parameter | FeatureParameter |
| | | | Dn | DirectoryNumber |
| 31 | 32 | 33 | 34 ...................... | Value: 1 2 3 4 |
| A2 | 0F | 30 | 0D Result OPDU | Sequence |
| 02 | 01 | 7C | InvokeId................... | Word(124) |
| | | | Operation Is>>>>>>>>>>>>>>> | InvokeCallFuncti<<<<<<<<<<< |
| 30 | 08 | | Result | Sequence |
| 7E | 06 | | Addressing | Addressing |
| | | | DataLost | ABSENT |
| 53 | 01 | 18 | Invoke Addr.................. | Address(24) |
| 53 | 01 | 63 | Server Addr.................. | Address(99) |
| | | | Program Feature | |
| A1 | 1A | 30 | 18 Invoke OPDU | Sequence |
| 02 | 01 | 7D | InvokeId................... | Word(125) |
| 02 | 01 | 19 | OperationCode............... | Word(25) |
| | | | Operation Is>>>>>>>>>>>>>>> | ProgramFeature<<<<<<<<<<< |
| 30 | 10 | | Argument | Sequence |
| 7E | 06 | | Addressing | Addressing |
| | | | DataLost | ABSENT |
| 53 | 01 | 19 | InvokeAddr.................. | Address(25) |
| 53 | 01 | 37 | ServerAddr.................. | Address(55) |
| 81 | 01 | | Target | TargetEntity |
| 10 | | | Lid.......................... | Lid(16) |
| A1 | 03 | | FeatureName | FeatureInfo |
| 80 | 01 | | HostFeature | HostFeature |
| 01 | | | MsgWaitingCntUpd............ | Word(1) |
| A2 | 0F | 30 | 0D Result OPDU | Sequence |
| 02 | 01 | 7D | InvokeId................... | Word(125) |
| | | | Operation Is>>>>>>>>>>>>>>> | ProgramFeature<<<<<<<<<<< |
| 30 | 08 | | Result | Sequence |
| 7E | 06 | | Addressing | Addressing |
| | | | DataLost | ABSENT |
| 53 | 01 | 19 | InvokeAddr.................. | Address(25) |
| 53 | 01 | 37 | ServerAddr.................. | Address(55) |
| A1 | 1A | 30 | 18 Invoke OPDU | Sequence |
| 02 | 01 | 7D | InvokeId................... | Word(125) |
| 02 | 01 | 19 | OperationCode............... | Word(25) |
| | | | Operation Is>>>>>>>>>>>>>>> | ProgramFeature<<<<<<<<<<< |
| 30 | 10 | | Argument | Sequence |
| 7E | 06 | | Addressing | Addressing |

APPENDIX J -continued

|    |    |    |    |                      |                           |
|----|----|----|----|----------------------|---------------------------|
|    |    |    |    | DataLost             | ABSENT                    |
| 53 | 01 | 19 |    | InvokeAddr.......... | Address(25)               |
| 53 | 01 | 37 |    | ServerAddr.......... | Address(55)               |
| 81 | 01 |    |    | Target               | TargetEntity              |
| 10 |    |    |    | Lid................. | Lid(16)                   |
| A0 | 03 |    |    | FeatureName          | FeatureInfo               |
| 86 | 01 |    |    | PbxFeature           | PBXFeature                |
| 01 |    |    |    | DoNotDisturbActi     | Boolean                   |
|    |    |    |    | TRUE.................| Value (1)                 |
| A2 | 0F | 30 | 0D | Result OPDU          | Sequence                  |
| 02 | 01 | 7D |    | InvokeId............ | Word(125)                 |
|    |    |    |    | Operation Is>>>>>>>>>>>>>>>>> | ProgramFeature<<<<<<<<<<<< |
| 30 | 08 |    |    | Result               | Sequence                  |
| 7E | 06 |    |    | Addressing           | Addressing                |
|    |    |    |    | DataLost             | ABSENT                    |
| 53 | 01 | 19 |    | InvokeAddr.......... | Address(25)               |
| 53 | 01 | 37 |    | ServerAddr.......... | Address(55)               |

Device Control

Seize Set

|    |    |    |    |                      |                           |
|----|----|----|----|----------------------|---------------------------|
| A1 | 1E | 30 | 1C | Invoke OPDU          | Sequence                  |
| 02 | 01 | 5A |    | InvokeId............ | Word(90)                  |
| 02 | 01 | 28 |    | OperationCode....... | Word(40)                  |
|    |    |    |    | Operation Is>>>>>>>>>>>>>>>>> | SeizeSet<<<<<<<<<<<< |
| 30 | 14 |    |    | Argument             | Sequence                  |
| 7E | 06 |    |    | Addressing           | Addressing                |
|    |    |    |    | DataLost             | ABSENT                    |
| 53 | 01 | 28 |    | InvokeAddr.......... | Address(40)               |
| 53 | 01 | 00 |    | ServerAddr.......... | Address(0)                |
| 54 | 01 | 06 |    | Lid................. | Lid(6)                    |
| 57 | 01 | 01 |    | ApplicNo             | ApplicationNo             |
|    |    |    |    |                      | Value (1)                 |
| 50 | 01 | 01 |    | Mode                 | SharingMode               |
|    |    |    |    | Exclusive............| Value (1)                 |
| 50 | 01 | 01 |    | EchoMode             | KeypadEchoMode            |
|    |    |    |    | NormalEcho...........| Value (1)                 |
| A2 | 0F | 30 | 0D | Result OPDU          | Sequence                  |
| 02 | 01 | 5A |    | InvokeId............ | Word(90)                  |
|    |    |    |    | Operation Is>>>>>>>>>>>>>>>>> | SeizeSet<<<<<<<<<<<< |
| 30 | 08 |    |    | Result               | Sequence                  |
| 7E | 06 |    |    | Addressing           | Addressing                |
|    |    |    |    | DataLost             | ABSENT                    |
| 53 | 01 | 28 |    | InvokeAddr.......... | Address(40)               |
| 53 | 01 | 78 |    | ServerAddr.......... | Address(120)              |

Interrogate Set

|    |    |    |    |                      |                           |
|----|----|----|----|----------------------|---------------------------|
| A1 | 18 | 30 | 16 | Invoke OPDU          | Sequence                  |
| 02 | 01 | 5B |    | InvokeId............ | Word(91)                  |
| 02 | 01 | 29 |    | OperationCode....... | Word(41)                  |
|    |    |    |    | Operation Is>>>>>>>>>>>>>>>>> | InterrogateSet<<<<<<<<<<<< |
| 30 | 0E |    |    | Argument             | Sequence                  |
| 7E | 06 |    |    | Addressing           | Addressing                |
|    |    |    |    | DataLost             | ABSENT                    |
| 53 | 01 | 28 |    | InvokeAddr.......... | Address(40)               |
| 53 | 01 | 78 |    | ServerAddr.......... | Address(120)              |
| 54 | 01 | 06 |    | Lid................. | Lid(6)                    |
| 57 | 01 | 01 |    | ApplicNo             | ApplicationNo             |
|    |    |    |    |                      | Value (1)                 |
| A2 | 1E | 30 | 1C | Result OPDU          | Sequence                  |
| 02 | 01 | 5B |    | InvokeId............ | Word(91)                  |
|    |    |    |    | Operation Is>>>>>>>>>>>>>>>>> | InterrogateSet<<<<<<<<<<<< |
| 30 | 17 |    |    | Result               | Sequence                  |
| 7E | 06 |    |    | Addressing           | Addressing                |
|    |    |    |    | DataLost             | ABSENT                    |
| 53 | 01 | 28 |    | InvokeAddr.......... | Address(40)               |
| 53 | 01 | 78 |    | ServerAddr.......... | Address(120)              |
| 50 | 01 | 01 |    | Status               | SetStatus                 |
|    |    |    |    | Suspended............| Value (1)                 |
| 54 | 01 | 06 |    | Lid................. | Lid(6)                    |
| 57 | 01 | 01 |    | ApplicNo             | ApplicationNo             |
|    |    |    |    |                      | Value (1)                 |
| 50 | 01 | 01 |    | Mode                 | SharingMode               |
|    |    |    |    | Exclusive............| Value (1)                 |
| 50 | 01 | 01 |    | EchoMode             | KeypadEchoMode            |
|    |    |    |    | Normal Echo..........| Value (1)                 |

Release Set

|    |    |    |    |                      |                           |
|----|----|----|----|----------------------|---------------------------|
| A1 | 18 | 30 | 16 | Invoke OPDU          | Sequence                  |
| 02 | 01 | 5C |    | InvokeId............ | Word(92)                  |
| 02 | 01 | 2A |    | OperationCode....... | Word(42)                  |
|    |    |    |    | Operation Is>>>>>>>>>>>>>>>>> | ReleaseSet<<<<<<<<<<<< |
| 30 | 0E |    |    | Argument             | Sequence                  |
| 7E | 06 |    |    | Addressing           | Addressing                |

-continued

APPENDIX J

|    |    |    |    |                  |                      |
|----|----|----|----|------------------|----------------------|
|    |    |    |    | DataLost         | ABSENT               |
| 53 | 01 | 28 |    | InvokeAddr...... | Address(40)          |
| 53 | 01 | 78 |    | ServerAddr...... | Address(120)         |
| 54 | 01 | 06 |    | Lid.............. | Lid(6)              |
| 57 | 01 | 01 |    | ApplicNo         | ApplicationNo        |
|    |    |    |    |                  | Value (1)            |
| A2 | 0F | 30 | 0D | Result OPDU      | Sequence             |
| 02 | 01 | 5C |    | InvokeId......   | Word(92)             |
|    |    |    |    | Operation Is>>>>>>>>>>>>>>>>> | ReleaseSet<<<<<<<<<<<< |
| 30 | 08 |    |    | Result           | Sequence             |
| 7E | 06 |    |    | Addressing       | Addressing           |
|    |    |    |    | DataLost         | ABSENT               |
| 53 | 01 | 28 |    | InvokeAddr...... | Address(40)          |
| 53 | 01 | 78 |    | ServerAddr...... | Address(120)         |
|    |    |    |    | Display          |                      |
| A1 | 26 | 30 | 24 | Invoke OPDU      | Sequence             |
| 02 | 01 | 5D |    | InvokeId......   | Word(93)             |
| 02 | 01 | 2B |    | OperationCode.... | Word(43)            |
|    |    |    |    | Operation Is>>>>>>>>>>>>>>>>> | Display<<<<<<<<<<<< |
| 30 | 1C |    |    | Argument         | Sequence             |
| 7E | 06 |    |    | Addressing       | Addressing           |
|    |    |    |    | DataLost         | ABSENT               |
| 53 | 01 | 28 |    | InvokeAddr...... | Address(40)          |
| 53 | 01 | 78 |    | ServerAddr...... | Address(120)         |
| 54 | 01 | 06 |    | Lid.............. | Lid(6)              |
| 57 | 01 | 01 |    | ApplicNo         | ApplicationNo        |
|    |    |    |    |                  | Value (1)            |
| 79 | 06 |    |    | Position         | X_Y_Coords           |
| 50 | 01 | 1A |    | X_Coord......    | Byte(26)             |
| 50 | 01 | 14 |    | Y_Coord......    | Byte(20)             |
| 80 | 04 |    |    | Value            | DisplayBuffer        |
|    |    |    |    | Str              | IA5String            |
| 46 | 72 | 65 | 64 | ..........       | Value: F r e d       |
| A2 | 0F | 30 | 0D | Result OPDU      | Sequence             |
| 02 | 01 | 5D |    | InvokeId......   | Word(93)             |
|    |    |    |    | Operation Is>>>>>>>>>>>>>>>>> | Display<<<<<<<<<<<< |
| 30 | 08 |    |    | Result           | Sequence             |
| 7E | 06 |    |    | Addressing       | Addressing           |
|    |    |    |    | DataLost         | ABSENT               |
| 53 | 01 | 28 |    | InvokeAddr...... | Address(40)          |
| 53 | 01 | 78 |    | ServerAddr...... | Address(120)         |
| A1 | 23 | 30 | 21 | Invoke OPDU      | Sequence             |
| 02 | 01 | 5D |    | InvokeId......   | Word(93)             |
| 02 | 01 | 2B |    | OperationCode    | Word(43)             |
|    |    |    |    | Operation Is>>>>>>>>>>>>>>>>> | Display<<<<<<<<<<<< |
| 30 | 19 |    |    | Argument         | Sequence             |
| 7E | 06 |    |    | Addressing       | Addressing           |
|    |    |    |    | DataLost         | ABSENT               |
| 53 | 01 | 28 |    | InvokeAddr...... | Address(40)          |
| 53 | 01 | 78 |    | ServerAddr...... | Address(120)         |
| 54 | 01 | 06 |    | Lid.............. | Lid(6)              |
| 57 | 01 | 01 |    | ApplicNo         | ApplicationNo        |
|    |    |    |    |                  | Value (1)            |
| 79 | 06 |    |    | Position         | X_Y_Coords           |
| 50 | 01 | 1A |    | X_Coord......    | Byte(26)             |
| 50 | 01 | 14 |    | Y_Coord......    | Byte(20)             |
| 81 | 01 |    |    | Value            | DisplayBuffer        |
| 0C |    |    |    | Tone......       | Byte(12)             |
| A2 | 0F | 30 | 0D | Result OPDU      | Sequence             |
| 02 | 01 | 5D |    | InvokeId......   | Word(93)             |
|    |    |    |    | Operation Is>>>>>>>>>>>>>>>>> | Display<<<<<<<<<<<< |
| 30 | 08 |    |    | Result           | Sequence             |
| 7E | 06 |    |    | Addressing       | Addressing           |
|    |    |    |    | DataLost         | ABSENT               |
| 53 | 01 | 28 |    | InvokeAddr...... | Address(40)          |
| 53 | 01 | 78 |    | ServerAddr...... | Address(120)         |
| A1 | 22 | 30 | 20 | Invoke OPDU      | Sequence             |
| 02 | 01 | 5D |    | InvokeId......   | Word(93)             |
| 02 | 01 | 2B |    | OperationCode.... | Word(43)            |
|    |    |    |    | Operation Is>>>>>>>>>>>>>>>>> | Display<<<<<<<<<<<< |
| 30 | 18 |    |    | Argument         | Sequence             |
| 7E | 06 |    |    | Addressing       | Addressing           |
|    |    |    |    | DataLost         | ABSENT               |
| 53 | 01 | 28 |    | InvokeAddr...... | Address(40)          |
| 53 | 01 | 78 |    | ServerAddr...... | Address(120)         |
| 54 | 01 | 06 |    | Lid.............. | Lid(6)              |
| 57 | 01 | 01 |    | ApplicNo         | ApplicationNo        |
|    |    |    |    |                  | Value (1)            |
| 79 | 06 |    |    | Position         | X_Y_Coords           |
| 50 | 01 | 1A |    | X_Coord......    | Byte(26)             |
| 50 | 01 | 14 |    | Y_Coord......    | Byte(20)             |

-continued

APPENDIX J

```
84  00                    Value                               DisplayBuffer
                            ClearToEndOfLine                    Null
                          Key Stroke
A1  20   30   1E   Invoke OPDU                              Sequence
02  01   5E        InvokeId....................               Word(94)
02  01   2C        OperationCode...............              Word(44)
                     Operation Is>>>>>>>>>>>>>>>>             Keystroke<<<<<<<<<<<<
30  16             Argument                                  Sequence
7E  06               Addressing                                Addressing
                       DataLost                                 ABSENT
53  01   28            InvokeAddr..................            Address(40)
53  01   78            ServerAddr..................            Address(120)
54  01   06         Lid........................               Lid(6)
57  01   01         ApplicNo                                  ApplicationNo
                      .............................             Value (1)
6D  06             KeyEntry                                   KeyCode
50  01   02         Type                                       KeyType
                      SpecialKey..................              Value (2)
50  01   06         Value.......................              Byte(6)
A2  0F   30   0D   Result OPDU                              Sequence
02  01   5E        InvokeId....................               Word(94)
                     Operation Is>>>>>>>>>>>>>>>>             Keystroke<<<<<<<<<<<<
30  08             Result                                    Sequence
7E  06               Addressing                                Addressing
                       DataLost                                 ABSENT
53  01   28            InvokeAddr..................            Address(40)
53  01   78            ServerAddr..................            Address(120)
                                      Application Control
                   Define Application
A1  40   30   3E   Invoke OPDU                              Sequence
02  01   50        InvokeId....................               Word(80)
02  01   1E        OperationCode...............              Word(30)
                     Operation Is>>>>>>>>>>>>>>>>             DefineAppln<<<<<<<<<<<<
30  36             Argument                                  Sequence
7E  06               Addressing                                Addressing
                       DataLost                                 ABSENT
53  01   1E            InvokeAddr..................            Address(30)
53  01   00            ServerAddr..................            Address(0)
47  08              ShortName                                 EightChars
65  69   67   68                                                Value: e i g h
74  63   68   73    .............................                      t c h s
48  14              LongName                                  TwentyChars
54  77   65   6E                                                Value: T w e n
74  79   43   68    .............................                      t y C h
61  72   61   63                                                       a r a c
74  65   53   74                                                       t e S t
72  69   6E   67                                                       r i n g
49  02              AccessCode                                TwoDigits
31  32                                                          Value: 1 2
03  02              ValidStates                               ApplicationState
00  FF                Idle, Dialing, RouteDetermined, FaliedCall,
                      Connected
                      .............................
50  01   01         COS                                       ApplicationClass
                      Class 1....................               Value (1)
01  01   01         WillSeizeSet                              Boolean
                      TRUE.......................               Value (1)
A2  12   30   10   Result OPDU                              Sequence
02  01   50        InvokeId....................               Word(80)
                     Operation Is>>>>>>>>>>>>>>>>             DefineAppln<<<<<<<<<<<<
30  0B             Result                                    Sequence
7E  06               Addressing                                Addressing
                       DataLost                                 ABSENT
53  01   1E            InvokeAddr..................            Address(30)
53  01   82            ServerAddr..................            Address(130)
57  01   0B         ApplicNo                                  ApplicationNo
                      .............................             Value (11)
                   Undefine Application
A1  15   30   13   Invoke OPDU                              Sequence
02  01   51        InvokeId....................               Word(81)
02  01   1F        OperationCode...............              Word(31)
                     Operation Is>>>>>>>>>>>>>>>>             UndefineAppln<<<<<<<<<<<<
30  0B             Argument                                  Sequence
7E  06               Addressing                                Addressing
                       DataLost                                 ABSENT
53  01   1F            InvokeAddr..................            Address(31)
53  01   00            ServerAddr..................            Address(0)
57  01   06         ApplicNo                                  ApplicationNo
                      .............................             Value (6)
A2  0F   30   0D   Result OPDU                              Sequence
```

APPENDIX J

| | | | | |
|---|---|---|---|---|
| 02 | 01 | 51 | InvokeId................... | Word(81) |
| | | | Operation Is>>>>>>>>>>>>>>>>> | UndefineAppln<<<<<<<<<<<< |
| 30 | 08 | | Result | Sequence |
| 7E | 06 | | Addressing | Addressing |
| | | | DataLost | ABSENT |
| 53 | 01 | 1F | InvokeAddr.................. | Address(31) |
| 53 | 01 | 63 | ServerAddr.................. | Address(99) |
| | | | Interrogate Application | |
| A1 | 15 | 30 | 13 Invoke OPDU | Sequence |
| 02 | 01 | 52 | InvokeId................... | Word(82) |
| 02 | 01 | 20 | OperationCode.............. | Word(32) |
| | | | Operation Is>>>>>>>>>>>>>>>>> | InterrogateAppln<<<<<<<<<<<< |
| 30 | 0B | | Argument | Sequence |
| 7E | 06 | | Addressing | Addressing |
| | | | DataLost | ABSENT |
| 53 | 01 | 20 | InvokeAddr.................. | Address(32) |
| 53 | 01 | 00 | ServerAddr.................. | Address(0) |
| 57 | 01 | 06 | ApplicNo | ApplicationNo |
| | | | | Value (6) |
| A2 | 40 | 30 | 3E Result OPDU | Sequence |
| 02 | 01 | 52 | InvokeId................... | Word(82) |
| | | | Operation Is>>>>>>>>>>>>>>>>> | InterrogateAppln<<<<<<<<<<<< |
| 30 | 39 | | Result | Sequence |
| 7E | 06 | | Addressing | Addressing |
| | | | DataLost | ABSENT |
| 53 | 01 | 20 | InvokeAddr.................. | Address(32) |
| 53 | 01 | 63 | ServerAddr.................. | Address(99) |
| 50 | 01 | 01 | ApplicStatus | ApplicationStatu |
| | | | NotDefined.................. | Value (1) |
| 47 | 08 | | ShortName | EightChars |
| 65 | 69 | 67 | 68 | Value: e i g h |
| 74 | 63 | 68 | 61 | t c h a |
| 48 | 14 | | LongName | TwentyChars |
| 54 | 77 | 65 | 6E | Value: T w e n |
| 74 | 79 | 43 | 68 | t y C h |
| 61 | 72 | 61 | 63 | a r a c |
| 74 | 65 | 53 | 74 | t e S t |
| 72 | 69 | 6E | 67 | r i n g |
| 49 | 02 | | AccessCode | TwoDigits |
| 31 | 32 | | | Value: 1 2 |
| 03 | 02 | | ValidStates | ApplicationState |
| 02 | FF | | Idle, Dialing, RouteDetermined, FailedCall | |
| 50 | 01 | 01 | COS | ApplicationClass |
| | | | Class 1..................... | Value (1) |
| 01 | 01 | 01 | WillSeizeSet | Boolean |
| | | | TRUE....................... | Value (1) |
| | | | Invoke Application | |
| A1 | 36 | 30 | 34 Invoke OPDU | Sequence |
| 02 | 01 | 53 | InvokeId................... | Word(83) |
| 02 | 01 | 21 | OperationCode.............. | Word(33) |
| | | | Operation Is>>>>>>>>>>>>>>>>> | InvokeAppln<<<<<<<<<<<< |
| 30 | 2C | | Argument | Sequence |
| 7E | 06 | | Addressing | Addressing |
| | | | DataLost | ABSENT |
| 53 | 01 | 21 | InvokeAddr.................. | Address(33) |
| 53 | 01 | 82 | ServerAddr.................. | Address(130) |
| 57 | 01 | 06 | ApplicNo | ApplicationNo |
| | | | | Value (6) |
| 54 | 01 | 06 | Device..................... | Lid(6) |
| 6B | 1C | | DeviceType | DeviceClass |
| 63 | 06 | | Kind | SetKind |
| 50 | 01 | 02 | Manuf | Manufacturer |
| | | | Mitel....................... | Value (2) |
| 50 | 01 | 17 | Type | SetType |
| | | | SS 4 DN..................... | Value (23) |
| 6A | 12 | | Attribs | SetAttribs |
| 50 | 01 | 1E | NumRows.................... | Byte(30) |
| 50 | 01 | 50 | NumCols.................... | Byte(80) |
| 50 | 01 | 01 | DispType | DisplayType |
| | | | Printing.................... | Value (1) |
| 50 | 01 | 09 | NumDtmf............. | Byte(9) |
| 50 | 01 | 00 | NumSpecialKeys................ | Byte(0) |
| 50 | 01 | 01 | NumSpecialDisp................ | Byte(1) |
| A2 | 0F | 30 | 0D Result OPDU | Sequence |
| 02 | 01 | 53 | InvokeId................... | Word(83) |
| | | | Operation Is>>>>>>>>>>>>>>>>> | InvokeAppln<<<<<<<<<<<< |
| 30 | 08 | | Result | Sequence |
| 7E | 06 | | Addressing | Addressing |
| | | | DataLost | ABSENT |

APPENDIX J
-continued

| | | | | | |
|---|---|---|---|---|---|
| 53 | 01 | 21 | | InvokeAddr............... | Address(33) |
| 53 | 01 | 82 | | ServerAddr............... | Address(130) |

Error Messages

WARNING:
This is the format of all currently defined HCI error messages EXCEPT "unsupported_logtype" which may be returned from an EnableDataLog message. The "unsupported_logtype" error contains a parameter in addition to the Addressing parameter. Extra parameters may or may not be common in more complex application layer messages which will be defined in later versions of HCI.
IE: Handle the parameters of Errors in the same way all other parameters are defined.

| | | | | | |
|---|---|---|---|---|---|
| A1 | 42 | 30 | 40 | Invoke OPDU | Sequence |
| 02 | 01 | 50 | | InvokeId................ | Word(80) |
| 02 | 01 | 1E | | OperationCode............ | Word(30) |
| | | | | Operation Is>>>>>>>>>>>>>>>> | DefineAppln<<<<<<<<<<< |
| 30 | 38 | | | Argument | Sequence |
| 7E | 08 | | |   Addressing | Addressing |
| 05 | 00 | | |     DataLost | Null |
| 53 | 01 | 1E | |     InvokeAddr............... | Address(30) |
| 53 | 01 | 00 | |     ServerAddr............... | Address(0) |
| 47 | 08 | | |   ShortName | EightChars |
| 65 | 69 | 67 | 68 | | Value: e i g h |
| 74 | 63 | 68 | 73 | ............................ | t c h s |
| 48 | 14 | | |   LongName | TwentyChars |
| 54 | 77 | 65 | 6E | | Value: T w e n |
| 74 | 79 | 43 | 68 | | t y C h |
| 61 | 72 | 61 | 63 | | a r a c |
| 74 | 65 | 53 | 74 | | t e S t |
| 72 | 69 | 6E | 67 | | r i n g |
| 49 | 02 | | |   AccessCode | TwoDigits |
| 31 | 32 | | | ............................ | Value: 1 2 |
| 03 | 02 | | |   ValidStates | ApplicationState |
| 02 | F0 | | |     Idle, Dialing, RouteDetermined | |
| 50 | 01 | 01 | |   COS | ApplicationClass |
| | | | |     Class 1.................. | Value (1) |
| 01 | 01 | 01 | |   WillSeizeSet | Boolean |
| | | | |     TRUE.................... | Value (1) |
| A3 | 12 | 30 | 10 | Error OPDU | Sequence |
| 02 | 01 | 50 | | InvokeId................ | Word(80) |
| 02 | 01 | 02 | | ErrorCode | Word |
| | | | |   DuplicateApplnNa........... | Value (2) |
| | | | | Operation Is>>>>>>>>>>>>>>>> | DefineAppln<<<<<<<<<<< |
| 30 | 08 | | | Parameter | Sequence |
| 7E | 06 | | |   Addressing | Addressing |
| | | | |     DataLost | ABSENT |
| 53 | 01 | 1E | |     InvokeAddr............... | Address(30) |
| 53 | 01 | 63 | |     ServerAddr............... | Address(99) |
| A1 | 1E | 30 | 1C | Invoke OPDU | Sequence |
| 02 | 01 | 5A | | InvokeId................ | Word(90) |
| 02 | 01 | 28 | | OperationCode............ | Word(40) |
| | | | | Operation Is>>>>>>>>>>>>>>>> | SeizeSet<<<<<<<<<<< |
| 30 | 14 | | | Argument | Sequence |
| 7E | 06 | | |   Addressing | Addressing |
| | | | |     DataLost | ABSENT |
| 53 | 01 | 28 | |     InvokeAddr............... | Address(40) |
| 53 | 01 | 00 | |     ServerAddr............... | Address(0) |
| 54 | 01 | 06 | |   Lid.................... | Lid(6) |
| 57 | 01 | 01 | |   ApplicNo | ApplicationNo |
| | | | | ............................ | Value (1) |
| 50 | 01 | 01 | |   Mode | SharingMode |
| | | | |     Exclusive............... | Value (1) |
| 50 | 01 | 01 | |   EchoMode | KeypadEchoMode |
| | | | |     NormalEcho............... | Value (1) |
| A3 | 14 | 30 | 12 | Error OPDU | Sequence |
| 02 | 01 | 5A | | InvokeId................ | Word(90) |
| 02 | 01 | 09 | | ErrorCode | Word |
| | | | |   InvalidDevice............ | Value (9) |
| | | | | Operation Is>>>>>>>>>>>>>>>> | SeizeSet<<<<<<<<<<< |
| 30 | 0A | | | Parameter | Sequence |
| 7E | 08 | | |   Addressing | Addressing |
| 05 | 00 | | |     DataLost | Null |
| 53 | 01 | 28 | |     InvokeAddr............... | Address(40) |
| 53 | 01 | 63 | |     ServerAddr............... | Address(99) |

Reject Messages

| | | | | | |
|---|---|---|---|---|---|
| A1 | 12 | 30 | 10 | Invoke OPDU | Sequence |
| 02 | 01 | 65 | | InvokeId................ | Word(101) |
| 02 | 01 | 01 | | OperationCode............ | Word(1) |
| | | | | Operation Is>>>>>>>>>>>>>>>> | InterrogateHci<<<<<<<<<<< |

APPENDIX J -continued

| | | | | | |
|---|---|---|---|---|---|
| 30 | 08 | | | Argument | Sequence |
| 7E | 06 | | | Addressing | Addressing |
| | | | | DataLost | ABSENT |
| 53 | 01 | 14 | | InvokeAddr.................. | Address(20) |
| 53 | 01 | 14 | | ServerAddr.................. | Address(20) |
| A4 | 08 | 30 | 06 | Reject OPDU | Sequence |
| 02 | 01 | 65 | | InvokeId.................... | Word(101) |
| | | | | DataLost | ABSENT |
| 81 | 01 | 01 | | InvokeProblem | Integer |
| | | | | UnrecognizedOper............ | Value (1) |
| A4 | 07 | 30 | 05 | Reject OPDU | Sequence |
| 05 | 00 | | | InvokeId | Null (ABSENT) |
| | | | | DataLost | ABSENT |
| 80 | 01 | 02 | | GeneralProblem | Integer |
| | | | | BadlyStructuredO............ | Value (2) |
| A1 | 12 | 30 | 10 | Invoke OPDU | Sequence |
| 02 | 01 | 69 | | InvokeId.................... | Word(105) |
| 02 | 01 | 01 | | OperationCode.............. | Word(1) |
| | | | | Operation Is>>>>>>>>>>>>>>>> | InterrogateHci<<<<<<<<<<<< |
| 30 | 08 | | | Argument | Sequence |
| 7E | 06 | | | Addressing | Addressing |
| | | | | DataLost | ABSENT |
| 53 | 01 | 14 | | InvokeAddr.................. | Address(20) |
| 53 | 01 | 14 | | ServerAddr.................. | Address(20) |
| A4 | 08 | 30 | 06 | Reject OPDU | Sequence |
| 02 | 01 | 69 | | InvokeId.................... | Word(105) |
| | | | | DataLost | ABSENT |
| 81 | 01 | 02 | | InvokeProblem | Integer |
| | | | | MistypedArgument............ | Value (2) |
| A1 | 12 | 30 | 10 | Invoke OPDU | Sequence |
| 02 | 01 | 6D | | InvokeId.................... | Word(109) |
| 02 | 01 | 01 | | OperationCode.............. | Word(1) |
| | | | | Operation Is>>>>>>>>>>>>>>>> | InterrogateHci<<<<<<<<<<<< |
| 30 | 08 | | | Argument | Sequence |
| 7E | 06 | | | Addressing | Addressing |
| | | | | DataLost | ABSENT |
| 53 | 01 | 14 | | InvokeAddr.................. | Address(20) |
| 53 | 01 | 14 | | ServerAddr.................. | Address(20) |
| A4 | 08 | 30 | 06 | Reject OPDU | Sequence |
| 02 | 01 | 6D | | InvokeId.................... | Word(109) |
| | | | | DataLost | ABSENT |
| 81 | 01 | 00 | | InvokeProblem | Integer |
| | | | | DuplicateInvocat............ | Value (0) |
| A1 | 12 | 30 | 10 | Invoke OPDU | Sequence |
| 02 | 01 | 6F | | InvokeId.................... | Word(111) |
| 02 | 01 | 01 | | OperationCode.............. | Word(1) |
| | | | | Operation Is>>>>>>>>>>>>>>>> | InterrogateHci<<<<<<<<<<<< |
| 30 | 08 | | | Argument | Sequence |
| 7E | 06 | | | Addressing | Addressing |
| | | | | DataLost | ABSENT |
| 53 | 01 | 14 | | InvokeAddr.................. | Address(20) |
| 53 | 01 | 14 | | ServerAddr.................. | Address(20) |
| A4 | 0A | 30 | 08 | Reject OPDU | Sequence |
| 02 | 01 | 6F | | InvokeId.................... | Word(111) |
| 05 | 00 | | | DataLost | PRESENT |
| 81 | 01 | 01 | | InvokeProblem | Integer |
| | | | | UnrecognizedOper............ | Value (1) |

The embodiments of the invention in which an exclusive property or privilege is claimed are defined as follows:

1. Apparatus for effecting resource allocation remote operations in a pair of communication systems utilizing Open Systems Interconnect communication protocol, comprised of means within respective ones of said communication systems for generating predetermined operation data signals associated with an invoking Application Entity; means for transmitting said data signals between said communication systems in accordance with said protocol; and means within said communication systems for receiving said data signals and in response allocating a server Application Entity performing said remote operations; each of said operation data signals including a n Invoke Address signal for identifying said Invoking Application Entity, and a Server Address signal for identifying said server Application Entity, whereby said operation data signals are directed to respective ones of said invoking and server Application Entities identified by said Invoke Address and Server Address signals, a first one of said operation data signals being comprised of an invoke operation signal generated by said invoking Application Entity within a first one of said pair of communication systems and transmitted to said server Application Entity within the other of said pair of communication systems for invoking performance of a predetermined one of said remote operations via said server Application Entity.

2. Apparatus as defined in claim 1, wherein a second one of said operation data signals is comprised of a result data signal for transmission to said invoking Application Entity for acknowledging successful performance of said predetermined remote operation and reporting results thereof.

3. Apparatus as defined in claim 1, wherein a first one of said pair of communication systems is a host computer and the other of said communication systems is a PABX.

4. Apparatus as defined in claim 1 or 2 wherein a further one of said operation data signals is comprised of an error data signal generated by said server Application Entity and transmitted to said invoking Application Entity for indicating unsuccessful performance of said predetermined remote operation.

5. Apparatus as defined in claim 1 or 2 wherein a further one of said operation data signals is comprised of a reject data signal generated by said server Application Entity and transmitted to said invoking Application Entity for indicating reception of a malformed invoke operation data signal from said invoking Application Entity.

6. Apparatus as defined in claim 3, wherein a remote operation is comprised of interrogating said PABX to determined whether said PABX supports implementation of said remote operations conforming to said Open Systems Interconnect communication protocol.

7. Apparatus as defined in claim 3, wherein a remote operation is comprised of terminating all said remote operations and resetting said host computer and PABX.

8. Apparatus as defined in claim 2, wherein said result data signal further includes a logical equipment identifier signal for indentifying a predetermined resource within said other one of said communication systems.

9. Apparatus as defined in claim 8, wherein a first one of said pair of communication systems is a host computer and the other one of said communication systems is a PABX.

10. Apparatus as defined in claim 9, in which, in said other of the pair of communication systems, performance of said predetermined one of the remote operations is invoked via said service Application Entity, said invoke operation signal being further comprised of a call reference data signal for indicating to said host computer which one of a plurality of calls on said predetermined resource is associated with said invoked remote operation.

11. Apparatus as defined in claim 3, wherein a remote operation is comprised of initiating a call from a predetermined source device of said PABX to a predetermined destination, said source device and destination being specified via said operation data signals.

12. Apparatus as defined in claim 3, further comprised of means within said PABX for clearing a call established between a predetermined source device of said PABX and a predetermined destination, said source device and destination being specified by said operation data signals.

13. A method of communicating for implementation of remote operations within two communication systems, conforming to Open Systems Interconnect communication protocol, comprising the steps of:
(a) generating and encoding an invoke operation signal associated with a predetermined Application Entity allocated within a first one of said communication systems, said invoke operation signal including an Invoke Address signal for identifying said predetermined Application Entity,
(b) transmitting said invoke operation signal from said first communication systems for reception by the other of said communication systems,
(c) receiving said invoke operation signal within said other communication system, and in response allocating a further Application Entity therein for performing a predetermined remote operation,
(d) generating an encoding a result operation signal associated with said further Application Entity, said result operation signal being comprised of said Invoke Address signal, a Server Address signal for identifying said further Application Entity, and an argument data signal specifying predetermined parameters resulting from performance of said predetermined remote operation,
(e) transmitting said result operation signal from said other communication system for reception by said first communication system, and
(f) receiving and routing said result operation signal within said first communication system to said first Application Entity identified by said Invoke Address signal, whereby performance of said predetermined remote operation is acknowledged.

14. A method of communicating for implementation of remote operations within two communication systems, conforming to Open Systems Interconnect communication protocol, comprising the steps of:
(a) generating and encoding an invoke operation signal associated with a predetermined Application Entity allocated within a first one of said communication systems, said invoke operation signal including an Invoke Address signal for identifying said predetermined Application Entity,
(b) transmitting said invoke operation signal from said first communication system for reception by the other of said communication systems,
(c) receiving said invoke operation signal within said other communication system, and in response allocating a further Application Entity therein for performing a predetermined remote operation,
(d) generating and encoding an error operation signal associated with said further Application Entity, said error operation signal being comprised of said Invoke Address signal, A server Address signal for identifying said further Application Entity, an error code signal for identifying a predetermined error made in attempting to perform said predetermined remote operation, and a parameter data signal specifying predetermined parameters of said error,
(e) transmitting said error operation signal from said other communication system for reception by said first system, and
(f) receiving and routing said error operation signal within said first system to said first Application Entity identified by said Invoke Address signal, for acknowledging failure to successfully complete said predetermined remote operation which performance was attempted by said further Application Entity.

15. A method as defined in claim 13 or 14 wherein said predetermined remote operation is comprised of interrogating said other system to determine whether said other system supports implementation of said remote operations conforming to said Open Systems Interconnect communications protocol.

16. A method as defined in claim 13 or 14 wherein said predetermined remote operation is comprised of terminating all said remote operations and resetting said first and other systems.

17. A method of communicating for implementation of remote operations within two communication systems, conforming to Open Systems Interconnect communication protocol, comprising the steps of:
- (a) generating and encoding an invoke operation signal associated with a predetermined Application Entity allocated within a first one of said communication systems, said invoke operation signal including an Invoke Address signal for identifying said predetermined Application Entity,
- (b) transmitting said invoke operation signal from said first communication system for reception by the other of said communication systems,
- (c) receiving said invoke operation signal within said other communication system, and in response allocating a further Application Entity therein for performing a predetermined remote operation,
- (d) generating and encoding a reject operation signal associated with said further Application Entity in the event of reception of a malformed invoke operation signal resulting in the further Application Entity failing to perform said predetermined remote operation, said reject operation signal being comprised of said Invoke Address signal, a Server Address signal for identifying said further Application Entity, and a problem data signal for specifying the cause of rejection of said malformed invoke operation signal,
- (e) transmitting said reject operation signal from said other communication system for reception by said first system, and
- (f) receiving and routing said reject operation signal within said first system to said first Application Entity identified by said Invoke Address signal, for acknowledging ejection of said malformed invoke operation signal by said further Application Entity.

* * * * *